March 24, 1970     B. A. ALEXANDER ET AL     3,501,825
TRANSFER FIXTURE
Filed Aug. 21, 1967     2 Sheets-Sheet 1
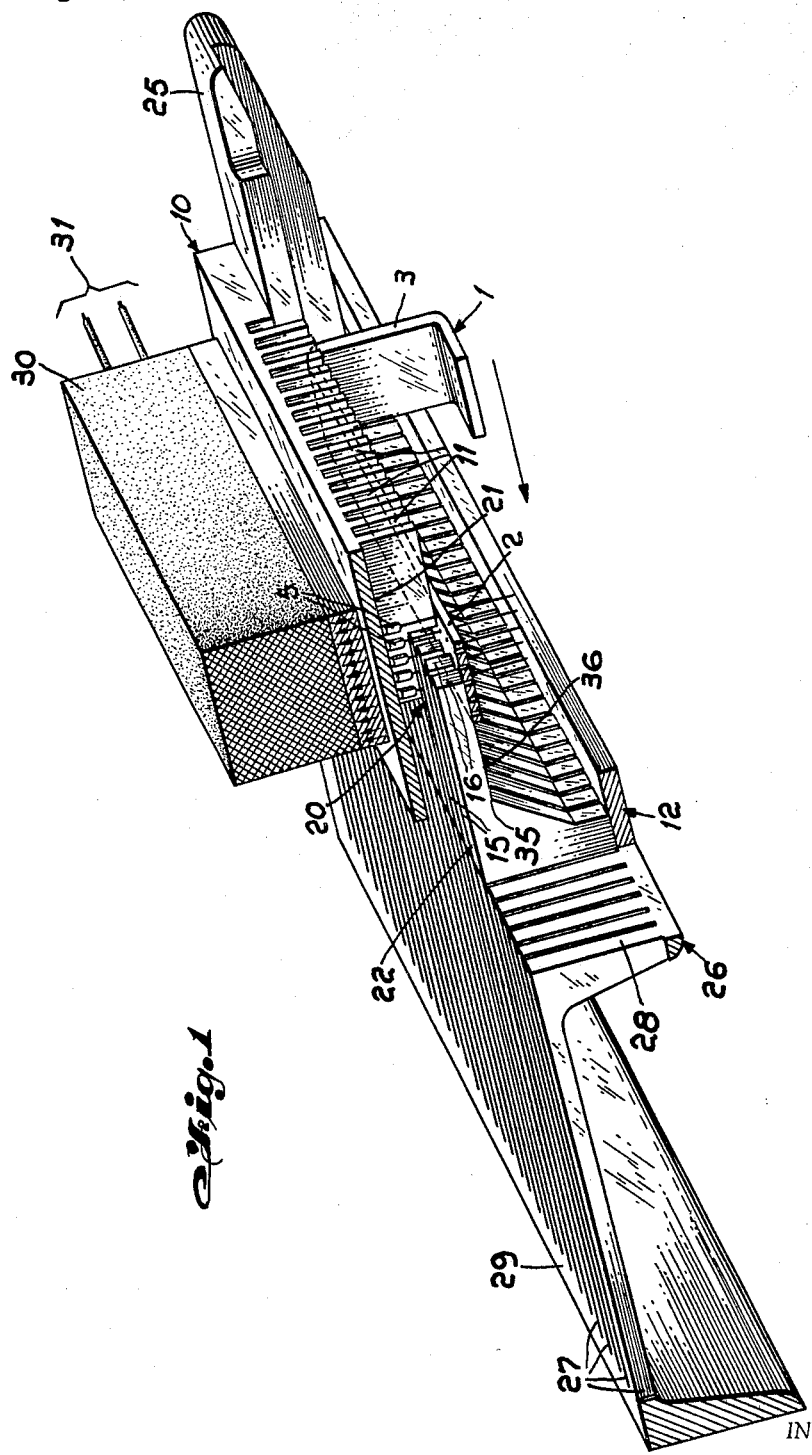
INVENTORS.
BRUCE A. ALEXANDER
BY SANDOR NAGY
ATTORNEY

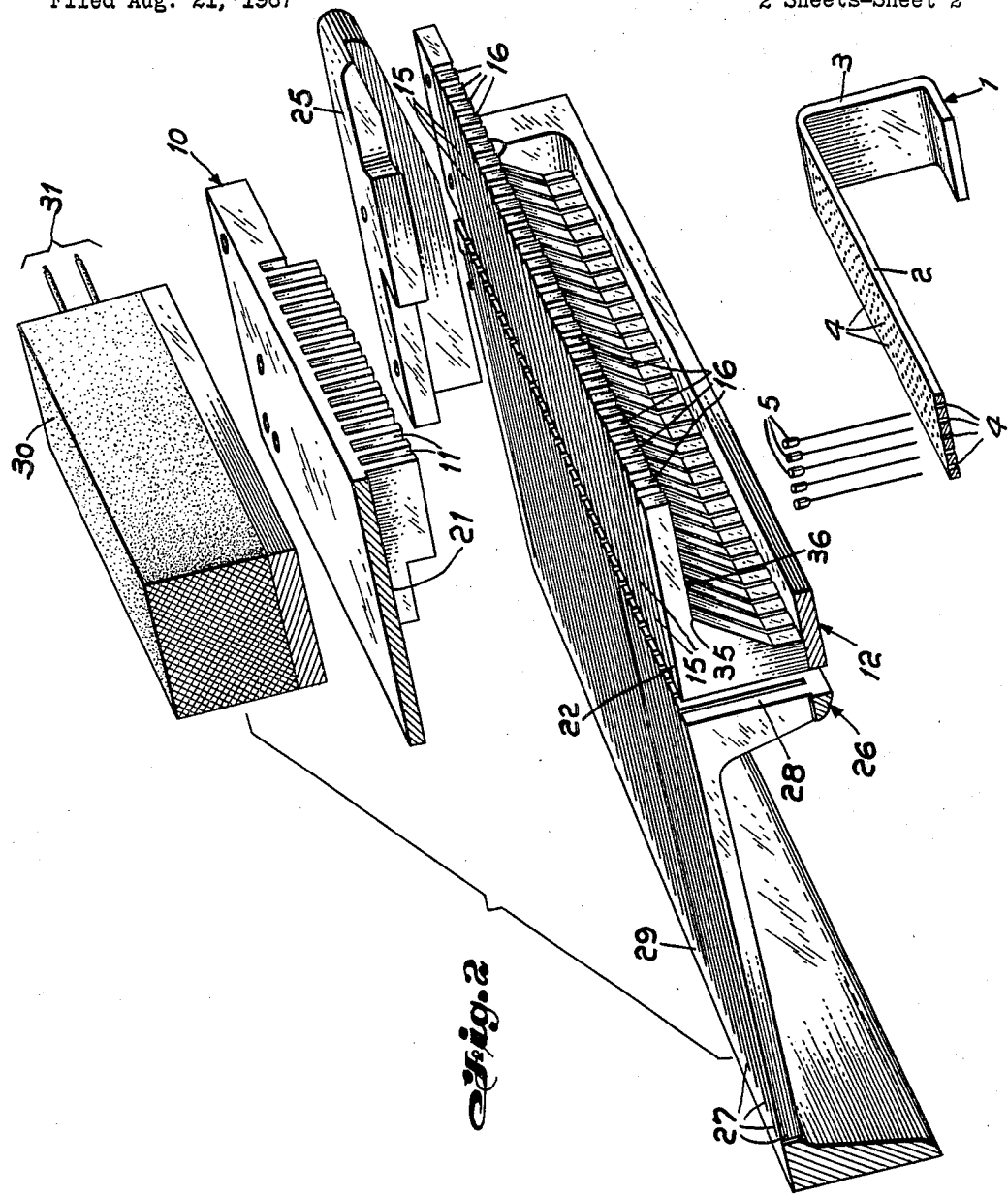

United States Patent Office 3,501,825
Patented Mar. 24, 1970

3,501,825
TRANSFER FIXTURE
Bruce A. Alexander, Stoneham, and Sandor Nagy, Lawrence, Mass., assignors to International Telephone and Telegraph Corporation, Nutley, N.J., a corporation of Delaware
Filed Aug. 21, 1967, Ser. No. 662,016
Int. Cl. H01r 43/04; B23q 7/10
U.S. Cl. 29—203   5 Claims

ABSTRACT OF THE DISCLOSURE

This is an apparatus for transferring first seals having an elongated portion of magnetizable material terminating at one end into an enlarged portion from a first fixture to a second fixture. The first fixture has a plurality of openings adapted to receive only the elongated portion. A first member has a plurality of parallel vertical slots extending from a bottom surface of said first member, the slots being adapted to receive the enlarged portions. The first fixture is disposed below the first slotted member and the fixture openings are aligned with the slots of the first member. An electromagnet is disposed above the first slotted member. The activation of this electromagnet causes the first seals to be lifted into the slots of the first member and towards its bottom surface. A second slotted member is disposed adjacent the first slotted member and the slots in the first member are aligned with the slots in the second member. The first fixture can be moved horizontally and vertically so as to enable the transfer of the first seals from the first fixture to the second slotted member when the electromagnet is deactivated. The second fixture has slots disposed adjacent the second slotted member with the slots in the second member being aligned with the slots in the second fixture. The first seals are then transferred from the first slotted member to the fixture by gravity feed.

RELATED PATENTS

A patent which relates to this subject is U.S. Patent No. 3,061,919.

BACKGROUND OF THE INVENTION

This invention relates in general to loading of parts into a fixture and in particular to accomplishing such loading by the use of magnetic means.

It is common to form a group of small parts into a composite structure by assembling the parts together with soldering or brazing material between the parts. The assemblies are then subjected to heat in the suitable furnace or other apparatus which will provide the necessary heat for sealing. Generally, the assemblies or subassemblies as the case may be are loaded into fixtures which are sometimes called boats and these boats are utilized in the furnace or other apparatus for holding purposes or for feeding component parts into automatic machines. U.S. Patent No. 3,061,919 referred to above provides for the loading of a small part which we can call a first seal that comprises a lead or elongated portion of small diameter which is sealed to or joined to an enlarged portion which may be either glass or metal as the case may be. If metal, it may be either magnetizable or not. This patent describes an apparatus for loading a solder boat with the first seals; the solder boat simply being a rectangular flat piece of metal bent over at the ends in the form of brackets and the longer surface being perforated with a multiplicity of holes in the regular pattern which holes are designed to accept the elongated portion of the first seals but will not accept the enlarged portion of the seals. The means for loading the solder boat are magnetic means and are fully described in the patent.

An object of this invention is to provide a transfer fixture for transferring the first seals from the solder boat after preliminary assembly in brazing operations have been performed thereon to a second fixture which is utilized for feeding the first seals into an automatic machine for completion of the work to be done thereon. Generally, the work to be done thereon is the addition of a second seal which is sealed onto the other end of the enlarged portion to complete the assembly and to form, in some cases, a diode having semiconductor elements therein.

DETAILED DESCRIPTION

The invention will be best understood by reference to the following description taken in conjunction with the accompanying drawings.

FIG. 1 shows an isometric view of the apparatus of this invention, and

FIG. 2 shows an exploded view of the parts of FIG. 1.

In FIGS. 1 and 2 there is shown the solder boat 1 previously described with reference to U.S. Patent No. 3,061,919. As shown, the solder boat comprises a rectangular surface 2 and two end surfaces in the form of a bracket 3. The solder boat 1 is perforated on the surface 2 with a plurality of openings 4 into which are loaded the end seals 5 in the manner described in U.S. Patent 3,061,919.

A first slotted member 10 having a plurality of slots 11 which are in alignment with the rows of openings in the solder boat 1 is shown at the right-hand portion of the apparatus. The slots 11 are of a width sufficient to accommodate easily the enlarged portion of the first seals 5. Adjacent to the first slotted member 10 and extending somewhat above thereof is a second slotted member 12 or transfer comb. The second slotted member 12 has a plurality of slots 15 in substantially exact alignment with slots 11, which are wide enough to accommodate the elongated or lead, portion of the first seals 5 but will not accommodate the enlarged portion thereof. The lead portions are made of magnetizable material, such as Dumet. The entrance to the slots 15 are chamfered as shown at 16 so that the elongated portions of the first seals can easily feed into the slots 15 if the alignment is not absolutely perfect. As shown in the drawings, there is a space 20 between the bottom 21 of slots 11 and the top surface 22 of the second slotted member. This space is somewhat larger than the length of the enlarged portion of the first seal so that as the first seals are drawn up to the bottom 21 of slots 11 when a magnetic field is applied then the elongated portion will enter into slots 15 of the second slotted member 12 and freely move therein, at the same time that the enlarged portion of the seals will move through the slots 11. It is understood that the slots 11 and the slots 15 have to be maintained in substantially perfect alignment with the minimum of tolerance so that the passage of the first seals 5 through the slots 11 and then into slots 15 will not be impeded. In order to align the pattern of holes 4 in the soldering boat 2 with the slots 11 there is provided a guide 25 at each end of the first slotted member 10. These two guides 25 guide the solder boat 1 when inserted by the operator in the space therebetween to perfect alignment of the openings 4 with the slots 11.

Adjacent to the second slotted member 12 is disposed a second fixture or storage rack, 26, which is in the form of a channel with slots 27 therein on surfaces 28 and 29 of the channel. These slots 27 are wide enough to accommodate the elongated portion of the first seals but will not accept the enlarged portion of the seals. Slots 27 are almost perfectly aligned with slots 15 of the second slotted member 12. Disposed above and on top of the first slotted member 10 is an electromagnet 30 having leads 31 which go to the appropriate power source and controls (not shown). In operation the operator will move the solder boat 1 loaded with the first seals 5 to the appropriate position between the guides 25 and then commence to move the solder boat inwardly away from the operator. When the solder boat 1 is completely beneath the first slotted member 10 the operator will switch on the power to the electromagnet 30 thus creating a magnetic field above the solder boat 1 with the first seals. The application of the magnetic field will pull the first seals 5 with the magnetizable elongated portions up towards the bottom 21 of slots 11 in the first slotted member. The operator will then move the solder boat away from her and deeper into the first slotted member 10 and the second slotted member 12. As can be seen, the first seals will thus move along the slots 11 and the elongated portions thereof will enter the slots 15 and move therealong. When the solder boat reaches the end 35 of the surface 36 of the second slotted member then the operator will switch off the power to the electromagnet 30 thus terminating the magnetic field and move the solder boat downwardly to clear the elongated portions of the first seals. The first seals now resting on the top surface 22 of the second slotted member 12 with the elongated portion thereof within the slots 15 will now move by virtue of gravity and pushed by other end seals inserted in the slots 15, down and towards the left into and along slots 27 of the second fixture 26. As shown in the drawings, the first slotted member 10, the second slotted member 12 and the second fixture 26 are inclined upward from the horizontal to provide the gravity force for the first seals to move downward out of the second slotted member into the second fixture 26 when the magnetic field is attenuated. When the second fixture 26 is filled wtih first seals it is then removed to storage or to the automatic machine for feeding the first seals thereon into the machine.

While the principles of the invention have been described above in connection with specific embodiments, and particular modifications thereof, it is to be clearly understood that this description is made only by way of example and not as a limitation on the scope of the invention.

We claim:
1. Apparatus for transferring first seals, having an elongated portion of magnetizable material terminating at one end into an enlarged portion, from a first fixture to a second fixture, comprising:
   said first fixture, having a plurality of openings adapted to receive only said elongated portion;
   a first member having a plurality of parallel vertical slots extending from a bottom surface of said first member, said slots adapted to receive said enlarged portion;
   means for disposing said first fixture below said first slotted member and aligning said fixture openings with said slots of said first member;
   electromagnetic means disposed above said first slotted member, the activation of said electromagnetic means causes said first seals to be lifted into said slots of said first member towards the bottom surface of said first member;
   a second slotted member disposed adjacent said first slotted member, the slots in said first slotted member being in alignment with the slots in said second slotted member;
   means for moving said first fixture horizontally and vertically so as to enable the transfer of said first seal from said first fixture to said second slotted member when said electromagnetic means are deactivated;
   said second fixture having slots therein disposed adjacent said second slotted member with the slots in said second member aligned with the slots in said second fixture; and
   means for transferring said first seals from said second slotted member to said second fixture.

2. Apparatus according to claim 1 wherein said disposing and aligning means includes members attached to the ends of said first slotted member to guide said first fixture therebetween.

3. Apparatus according to claim 1 wherein said electromagnetic means is movable over said first slotted member.

4. Apparatus according to claim 1 wherein said slots in said second slotted member are adapted to receive said elongated portion and have said enlarged portion of said first seals rest on the surface of said second slotted member.

5. Apparatus according to claim 1 wherein said transferring means includes inclining said first and second slotted members and said second fixture for gravity feed of said first seals into said second fixture.

References Cited
UNITED STATES PATENTS

| | | | |
|---|---|---|---|
| 2,334,004 | 11/1943 | Herzog | 269—8 X |
| 3,054,170 | 9/1962 | Benichasa et al. | |
| 3,061,919 | 11/1962 | Tack | 29—428 |
| 3,386,156 | 6/1968 | Griesemer et al. | |

THOMAS H. EAGER, Primary Examiner

U.S. Cl. X.R.

29—211